US011924808B2

(12) United States Patent
Chervyakov et al.

(10) Patent No.: US 11,924,808 B2
(45) Date of Patent: Mar. 5, 2024

(54) NR V2X SIDELINK RESOURCE RESELECTION AND REEVALUATION PROCEDURE

(71) Applicant: Intel Corporation, Santa Clara, CA (US)

(72) Inventors: Andrey Chervyakov, Nizhny Novgorod (RU); Alexey Khoryaev, Nizhny Novgorod (RU); Sergey Panteleev, Nizhny Novgorod (RU); Mikhail Shilov, Nizhny Novgorod (RU); Sergey Sosnin, Zavolzhie (RU)

(73) Assignee: Intel Coporation, Santa Clara, CA (US)

( * ) Notice: Subject to any disclaimer, the term of this patent is extended or adjusted under 35 U.S.C. 154(b) by 351 days.

(21) Appl. No.: 17/084,192

(22) Filed: Oct. 29, 2020

(65) Prior Publication Data

US 2021/0144680 A1 May 13, 2021

Related U.S. Application Data

(60) Provisional application No. 62/933,180, filed on Nov. 8, 2019.

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0094* (2013.01); *H04W 72/0446* (2013.01);
(Continued)

(58) Field of Classification Search
CPC ............ H04W 72/02; H04W 72/0406; H04W 72/0446; H04W 72/14; H04W 88/04;
(Continued)

(56) References Cited

U.S. PATENT DOCUMENTS

2019/0132818 A1\* 5/2019 Yasukawa ............. H04W 72/54
2020/0029340 A1\* 1/2020 He ......................... H04W 76/14
(Continued)

FOREIGN PATENT DOCUMENTS

WO WO-2019160863 A1 \* 8/2019
WO WO-2021107574 A1 \* 6/2021

*Primary Examiner* — Rina C Pancholi
(74) *Attorney, Agent, or Firm* — Schwegman Lundberg & Woessner, P.A.

(57) ABSTRACT

Techniques for sidelink resource selection, reselection, and reevaluation are disclosed. An apparatus for a user equipment (UE) includes processing circuitry coupled to memory. To configure the UE for 5G-NR sidelink communications, the processing circuitry is to decode an SCI format received via a PSCCH. The SCI format includes priority information for a scheduled PSSCH transmission. RRC signaling is decoded to determine first configuration information and second configuration information. The first configuration information identifies a sensing window, and the second configuration information identifies a resource selection window. A boundary of the resource selection window is based on the priority information. A set of candidate single-slot resources is determined during the sensing window using a resource pool. A resource is selected during the resource selection window from the set of candidate single-slot resources. Control information is encoded for a sidelink transmission via the PSCCH, where the sidelink transmission uses the resource.

14 Claims, 6 Drawing Sheets

(51) Int. Cl.
*H04W 72/0446* (2023.01)
*H04W 72/20* (2023.01)
*H04W 72/23* (2023.01)
*H04W 88/04* (2009.01)
*H04W 92/18* (2009.01)

(52) U.S. Cl.
CPC ........... *H04W 72/20* (2023.01); *H04W 72/23* (2023.01); *H04W 88/04* (2013.01); *H04W 92/18* (2013.01)

(58) Field of Classification Search
CPC .. H04W 92/18; H04W 74/0808; H04L 5/0094
See application file for complete search history.

(56) References Cited

U.S. PATENT DOCUMENTS

| | | | | |
|---|---|---|---|---|
| 2020/0367221 | A1* | 11/2020 | Maaref | H04W 24/08 |
| 2021/0212026 | A1* | 7/2021 | Peng | H04W 72/0446 |
| 2022/0173854 | A1* | 6/2022 | Chae | H04L 1/1893 |

* cited by examiner

NR V2X SIDELINK RESOURCE RESELECTION AND REEVALUATION PROCEDURE

PRIORITY CLAIM

This application claims the benefit of priority under 35 USC 119(e) to U.S. Provisional Patent Application Ser. No. 62/933,180, filed Nov. 8, 2019, and entitled "NR VEHICLE-TO-EVERYTHING SIDELINK RESOURCE RESELECTION AND REEVALUATION PROCEDURE." Tis provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks such as 5G NR unlicensed spectrum (NR-U) networks. Other aspects are directed to systems and methods for NR vehicle-to-everything (V2X) resource reselection and reevaluation procedure.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for NR V2X resource reselection and reevaluation procedure.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
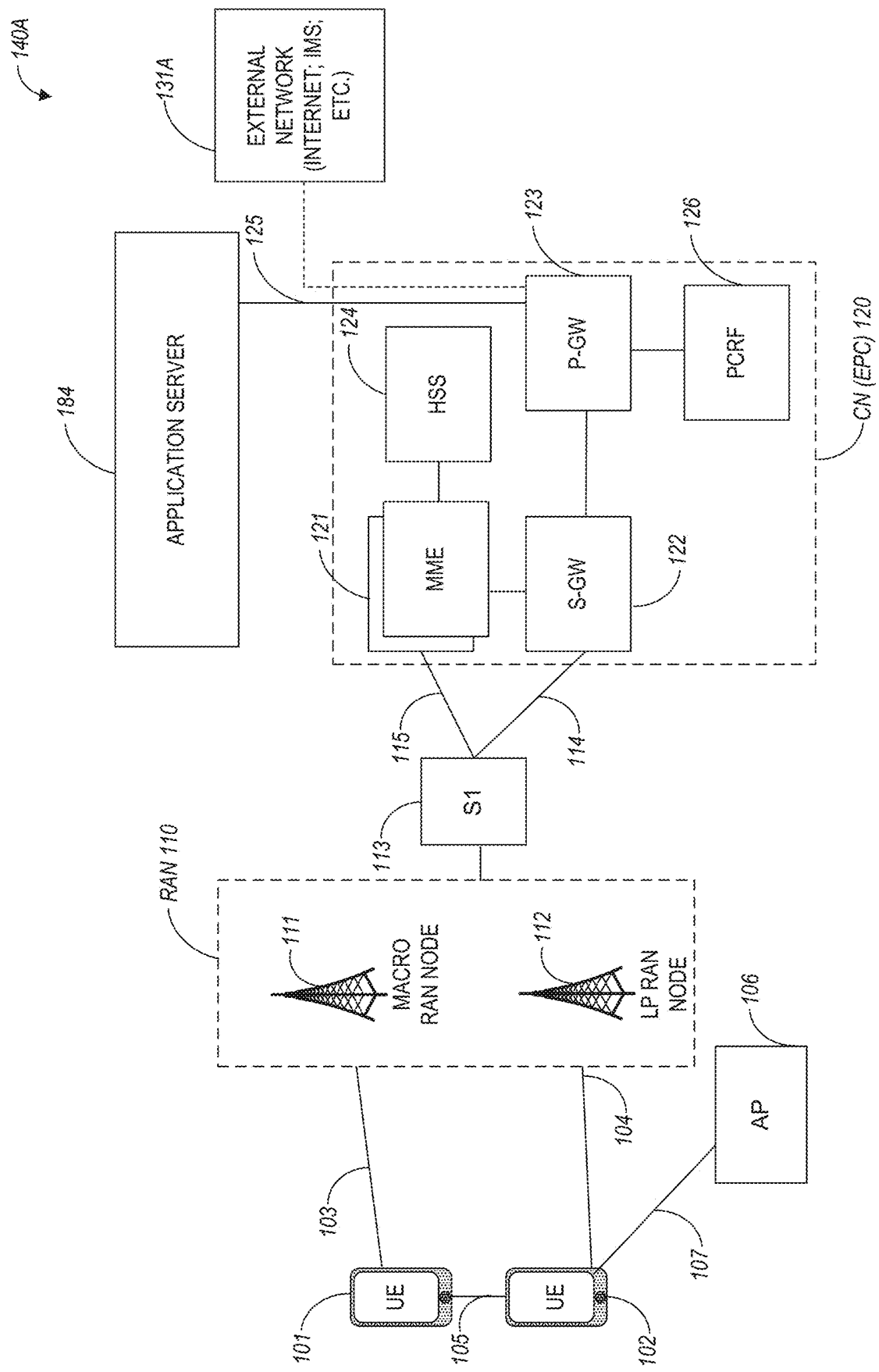
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC).

OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below): in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-IC). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
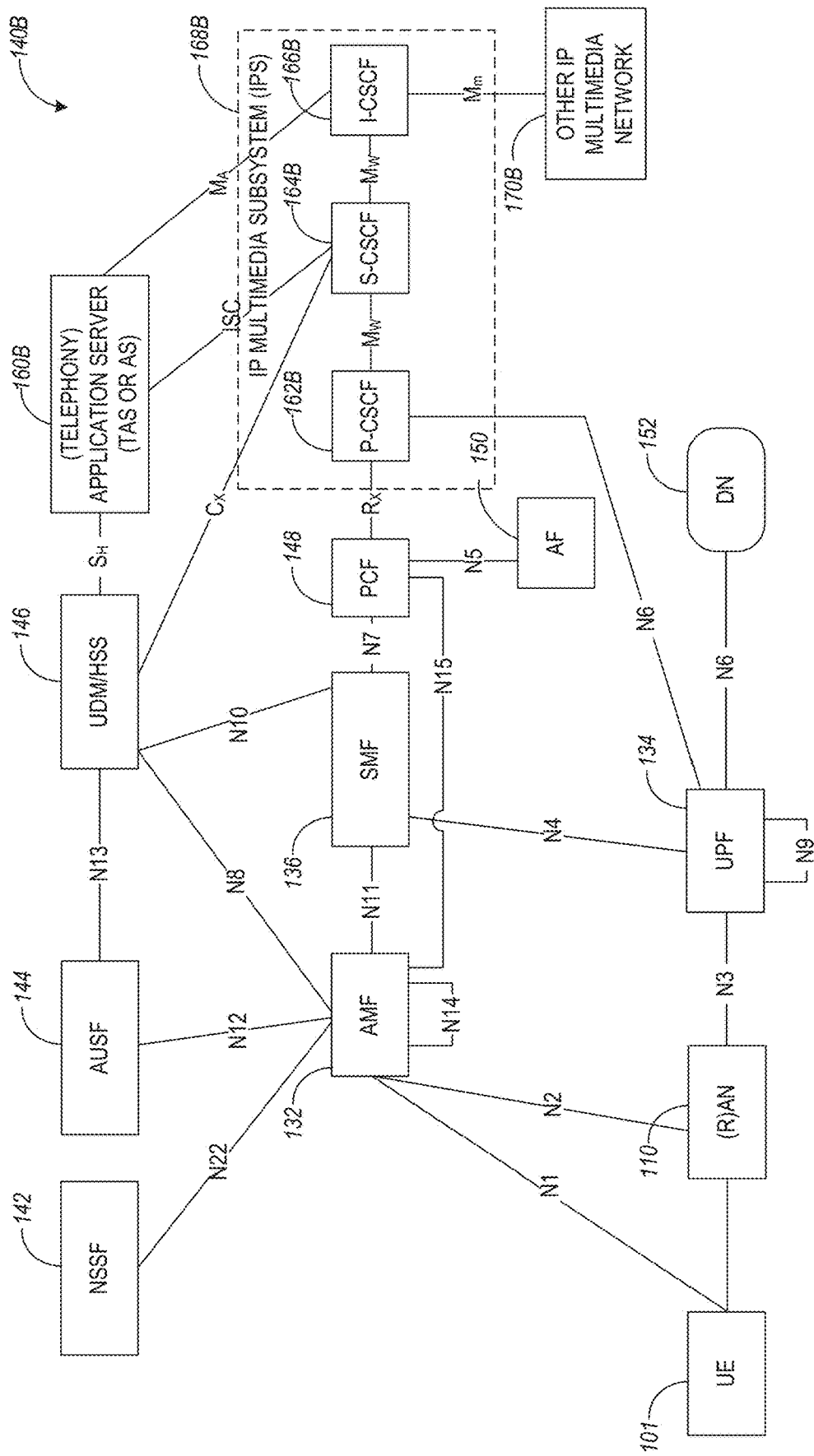
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services.

The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132). N3 (between the RAN 110 and UPF 134), N4 (between the SMF 136 and the UPF 134), N5 (between the PCF 148 and the AF 150, not shown), N6 (between the UPF 134 and the DN 152). N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown). N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
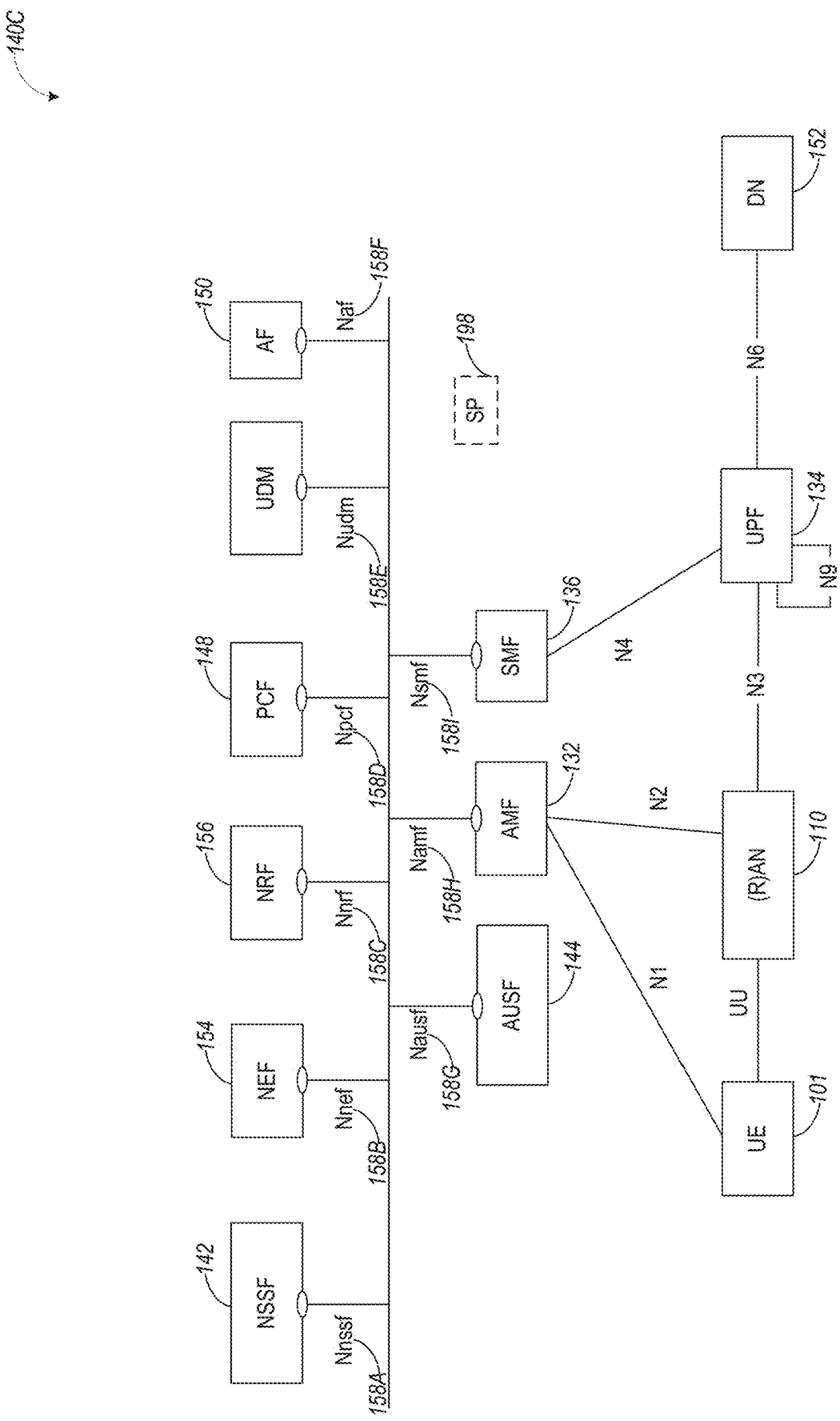

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard. 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In example embodiments, any of the UEs or base stations discussed in connection with FIG. 1A-FIG. 1C can be configured to operate using the techniques discussed in connection with FIG. 2 and FIG. 3.

Emerging V2X applications are characterized by various KPIs in terms of latency, data rate, and reliability. For cellular V2X communication on sidelink, the efficient resource (re)selection procedure suitable for periodic and aperiodic traffic is of high importance. Enhancements are discussed herein to enable support for the traffic of different types and various KPs.

The following enhancements are described herein: design enhancements to the configuration sensing, resource selection, and scheduling windows; enhancements to the resource selection procedure that enables continuous selected resource set refinement based on continuous medium sensing; enhancements to the procedure of selection of transmission resources out of candidate resources to enable early in time signal transmission; and enhancements to the sidelink resource reservation/pre-emption procedures.

Sensing, Resource Selection, and Scheduling Windows

Figure 2:
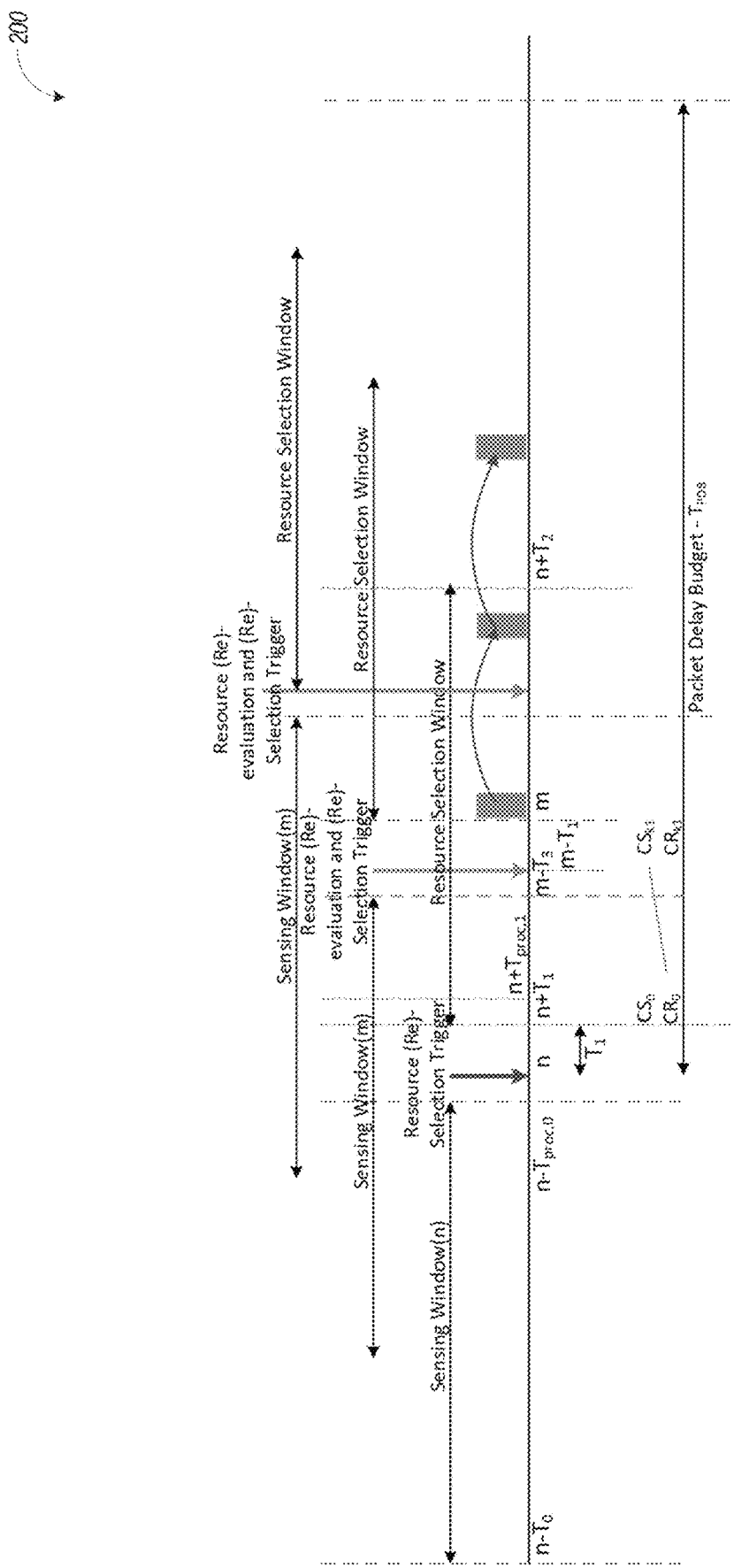
FIG. 2 illustrates sensing and resource selection windows including resource re-evaluation and re-selection windows, in accordance with some embodiments.

FIG. 2 illustrates a diagram 200 of sensing and resource selection windows including resource re-evaluation and re-selection windows, in accordance with some embodiments.

In some aspects, for a given time instance n when resource (re-) selection and re-evaluation procedure is triggered:

The resource selection window starts at time instance (n+T1), T1≥0 and ends at time instance (n+T2). The start of selection window T1 is up to UE implementation subject to T1≤Tproc,1. Time parameter T2 may be up to UE implementation with the following details as a (working assumption): T2≥T2min; If T2min>Remaining PDB, then T2min is modified to be equal to Remaining PDB; and FFS other details of T2min including whether the minimum window duration T2min–T1 is a function of priority. In some aspects, the UE selection of T2 shall fulfill the latency requirement, i.e. T2 S Remaining packet delay budget (PDB).

In some aspects, a sensing window is defined by time interval [n−T0, n−Tproc,0), where T0 is (pre-)configured, T0>Tproc,0 FFS further details. In some aspects, FFS, if Tproc,0 and Tproc,1 are defined separately or as a sum. In some aspects, FFS relation of T3, Tproc,0, Tproc,1. In some aspects, time instances n, T0, T1, T2, T2min are measured in slots, FFS Tproc,0, and Tproc,1.

In some aspects, the T2min may be a function of sidelink priority indicated in SCI and may be a configured parameter. In some aspects, given that T2min determines bounds of resource selection window, at least one of the T2min values may be aligned with scheduling window size (W). On the other hand, the configured T2min can be smaller or larger than W. The case that T2min could be less than W is a consequence of a working assumption that if T2min>Remaining PDB, then T2min is modified to be equal to Remaining PDB, considering that minimum of Remaining PDB is equal to 1. Therefore the actual value of T2min in any time instance is T2min=min (Remaining PDB, Configured T2min value).

Proposed Modifications:

In some aspects, T2min is (pre-)configured per each sidelink priority value indicated in SCI from the following set of values: $(5, 10, 20) \cdot 2^{\mu-1}$ slots, where $\mu$=1, 2, 3, and 4 for 15, 30, 60, and 120 kHz sub-carrier spacing (SCS), respectively. In some aspects, actual used T2min=min (Remaining PDB, Configured T2min value).

In some aspects, a UE is expected to select resources for all intended (re-)transmissions within the PDB, i.e. the number of intended (re-)transmissions is an input to the resource (re-)selection procedure.

This agreement aims to ensure that UE can select $M_{TARGET}$ resources for all intended (re)-transmissions of a transport block (TB) within a PDB. The open question is how and whether the resource selection procedure should ensure that UE can select $M_{TARGET}$ resources within PDB.

In some aspects, the following additional Mode-2 design principles may be used: Sidelink resource(s) reserved by SCI transmission at time instance "m" is a subset of candidate resources identified at time instance (m−T3).

In some aspects, the principle of the chain-based reservation may be ensured by restricting the maximum time gap between the first and the last Nmax contiguous resources being selected to be within W.

In some aspects, disclosed techniques include the following principles:

Resource Selection Principle:

In some aspects, for a given resource selection process within slots of the resource pool, where t(kp), t(kp+1), t(kp+2) are slots selected for potential PSCCH/PSSCH sidelink transmission, the distance in logical slots between t(kp+N−1)−t(kp)<W, where N=2 or N=3≤Nmax, kp index of selected sidelink resource within a resource pool, t(kp) logical index of sidelink resource in resource pool; and Nmax is a maximum number of resources indicated in SCI.

Sensing Window Design Principle:

In some aspects, the sensing window duration is controlled by the configurable parameter T0. In some aspects, the value of T0 can be selected from the following range $W \leq T0 \leq T_{SPS\_MAX\_PERIOD}$. $T_{SPS\_MAX\_PERIOD}$ is the maximum value of SPS periods supported by system configuration. In some aspects, configured value T0 puts a constraint on the maximum SPS period (PSPS) of the semi-persistent process indicated in SCI, i.e. PSPS≤T0.

In some aspects, for a resource reservation signaled in SCI at slot 'm', the following timing relationship can be defined with resource selection window [n+T1, n+T2]:

Alternative ("Alt.") 1 (preferred): n=m−T3−T1, where T3 is defined in slot units.

Alt. 2: n=ceil(m Tslot−T3−T)/Tslot, where Tslot is a slot duration.

Alt. 3: n=ceil(m Tslot−T3−Tproc,1)/Tslot, where Tslot is a slot duration.

Alt. 4: n=m−T3−Tproc,1, where T3 and Tproc,1 are defined in slot units.

Resource Selection Procedure

Disclosed techniques include the following proposed modifications:

In some aspects, for a resource reservation signaled in SCI at slot 'm', the UE selects M sidelink resources in resource selection window [n+T1, n+T2], where:

Alt.1. M is determined by UE implementation, M≤$M_{TARGET}$;

Alt.2. M=$M_{TARGET}$−$M_{TX}$;

$M_{TARGET}$ is the intended number of transmissions determined for a given TB; and $M_{TX}$ is a number of accomplished transmissions of a given TB including transmission at slot 'm'.

In some aspects, for a resource reservation signaled in SCI at slot 'm', the UE indicates reservation of N earliest in time resources out of M selected sidelink resources, where N≤M and N is determined by UE implementation subject to Nmax configuration constraints.

In some aspects, once initial resource reselection is triggered at time slot n:

Step-0. Initialize R(n−Δ) as an empty set of resources for potential sidelink transmission;

Step-1. Generate a set of candidate resource CS(n);

In some aspects, the UE forms a set of candidate resources for sidelink transmission—CS(n) based on the processing of sensing window [n−T0, n−Tproc,0) for the corresponding resource selection window [n+T1, n+T2].

Step-2. Select resources R(n) for potential transmission at slots t(n) from CS(n);

In some aspects, the UE selects M resources R(n)={R0(n), . . . , RM−1(n)} from CS(n) for potential sidelink transmission in slots t(n)={t0(n), . . . , tM−1(n)}, ordered in time, where (n+T1)≤t0(n) and t(M−1)(n)≤(n+T2).

Step-3. Re-evaluation of selected candidate resources;

In some aspects, the UE finds ∩ the intersection of CS(n) and R(n−Δ), i.e. $R_∩$(n)=CS(n)∩R(n−Δ).

In some aspects, the UE finds ∪ union $R_∪$(n) of intersection $R_∩$(n) and R(n):

$R_∪(n) = R_∩(n) ∪ R(n) = (CS(n) ∩ R(n−Δ)) ∪ R(n)$.

In some aspects, for the time slot n, UE selects and store M resources for potential transmission from $R_∪$(n), i.e. R(n)={R0(n), . . . , RM−1(n)} for transmission at slots t(n)={t0(n), . . . , tM−1(n)}.

In some aspects, the previously selected resources R(n−Δ) can be released (flashed out).

Step-4.

If (t0(n)=(n+T1)):

In some aspects, the UE transmits SCI at slot (n+T1) and indicates reserved resources R1(n) at slot t1(n) (or R1(n) and R2(n) at slots t1(n) and t2(n) respectively).

In some aspects, if UE needs to reserve additional sidelink resources, UE advances n by Δ towards slot t1(n)−T3 or to t2(n)−T3 and goes to Step-1. The next set of reserved resources is selected by UE at time instance R1(n)−T3 or R2(n)−T3. In some aspects, the UE indicates the reservation of additional sidelink resources during SCI transmission in R1(n) and R2(n) at time slots t1(n) and t2(n).

If (t0(n)>(n+T1)):

In some aspects, the UE advances n by Δ, i.e. n=n+Δ and goes to Step-1.

In some aspects, the maximum number of re-evaluation attempts may be configured. In this case, the number of re-evaluation attempts can be configured per transmission priority.

Selection of M Resources Out of Candidate Resources

In some aspects, for selection of M resources at time slot n out of the set of candidate resources CS(n) of size $M_{CS}$, the following procedure can be used:

In some aspects, the UE prioritizes the selection of at least one earliest in time candidate resource among $M_{EIT}$ earliest in time resources ($M_{EIT}$<$M_{CS}$) to announce its scheduling decision by PSCCH as soon as possible. In some aspects, remaining resources are selected randomly subject to conditions.

Proposed techniques include:

In some aspects, when resource (re)-selection is triggered at time instance n, UE determines number M of sidelink resources to be selected out of the set of candidate resources CS(n) of size $M_{CS}$. In some aspects, the UE prioritizes the selection of at least one earliest in time candidate resource among $M_{CS-EIT}$ earliest in time resources ($M_{EIT}$<$M_{CS}$), where $M_{EIT}$ is configured per priority. In some aspects, $M_{EIT}$ value is configured per CBR.

In some aspects, remaining (M−1) resources are randomly selected from CS(n) subject to signaling (scheduling) window—W constraints.

Relationship Between Timing Parameters

Figure 3:
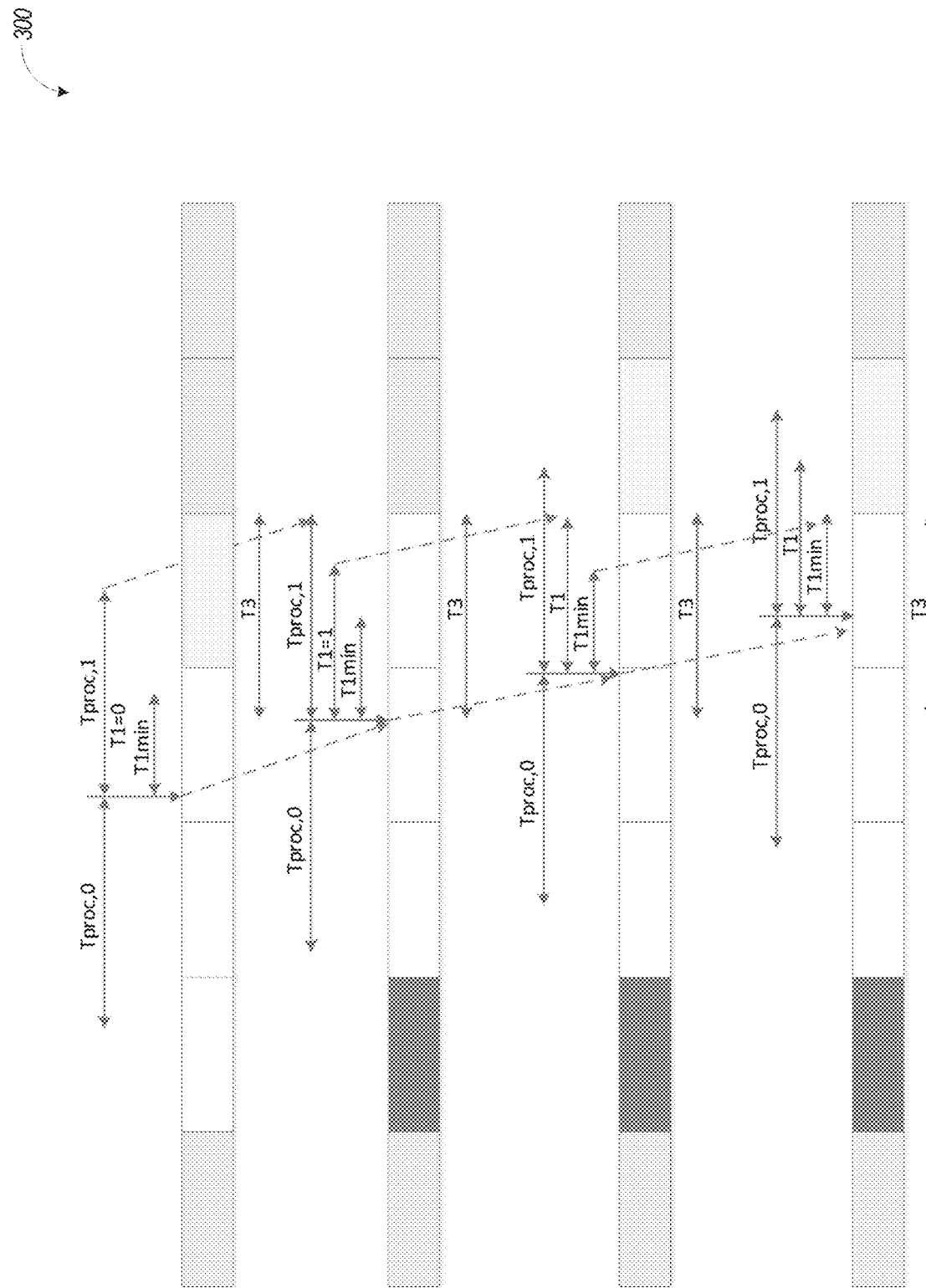
FIG. 3 illustrates timing relationships for timing values T3, Tproc,0, and Tproc,1 in accordance with some embodiments.

FIG. 3 illustrates a diagram 300 of timing relationships for timing values T3, Tproc,0, and Tproc,1 in accordance with some embodiments.

In some aspects, parameters T3, Tproc,0, Tproc,1 may be defined. These parameters may be defined as follows:

Tproc,0 is the time required to complete SCIs decoding and possibly perform RSRP measurements on DMRS for the sensing procedure;

Tproc,1 is the time required to identify candidate resources and select a subset of resources for potential sidelink transmission; and T3 is the maximum time needed to complete the sensing and resource selection procedure.

In some aspects, time instances n, T0, T1, T2, T2min are measured in slots.

In some aspects, the time instance when the UE receives a trigger for resource re-selection and re-evaluation is a fully UE internal procedure and can be known only by the UE. The timing of trigger with respect to current slot start and end boundaries cannot and should not be standardized which is the reason why n is measured in slots. The value of Tproc,0 can be derived but this value itself does not provide much value since to select resources, the value of Tproc,1 is needed; therefore only the sum of Tproc,0 and Tproc,1 may be considered. Considering that 0≤T1≤Tproc,1, we believe that Tproc,0 can be set to 0 and therefore sensing window redefined from [n−T0, n−Tproc,0) to [n−T0, n−1], then T3 is set to Tproc,1 and TProc,1 is defined in slots.

The same conclusion can be drawn from the analysis of FIG. 3.

In some aspects, disclosed techniques include the following proposed modifications:

In some aspects, the following relationship between T3, Tproc,0 and Tproc,1 may be defined:

Set Tproc,0 to 0 (Tproc,0=0);

Redefine sensing window [n−T0, n−Tproc,0) to [n−T0, n−1];

T3 and Tproc,1 are measured in slots; and

Set T3 to Tproc,1 i.e. T3=Tproc,1, and therefore T3 is not standardized.

Sidelink Resource Reservation/Pre-Emption

To support the preemption mechanism, in some aspects, it may be specified when the preemption mechanism is triggered. The following alternatives are possible:

Alternative 1. The preemption flag for each combination of pi and pj can be introduced, where pi is a priority indication associated with the resource indicated in SCI by other UEs, and pj is the priority of the transmission in the UE selecting resources similar to the agreed mechanism of RSRP threshold configuration.

Alternative 2. The preemption flag for the difference value of pi and pj can be introduced, where pi is the priority indication associated with the resource indicated in SCI by other UEs, and pj is the priority of the transmission in the UE selecting resources similar to the agreed mechanism of RSRP threshold configuration.

In addition, in some aspects, a bit indicating support of preemption (i.e. enabled/disabled) in each sidelink resource pool can be configured.

In some aspects, a method of sidelink autonomous resource (re)selection includes one or more of medium sensing, (re)selection triggers, the formation of a set of candidate resources, and a method to select resources for transmission. In some aspects, the minimum value of the T2 parameter (i.e. T2min) is preconfigured. In some aspects, the preconfigured value T2min is selected from the set of values which includes at least the following set of values: (5, 10, 20)·$2^{\mu-1}$ slots, where $\mu$=1, 2, 3, 4 for 15, 30, 60, 120 kHz SCS respectively. In some aspects, T2min is preconfigured per each sidelink priority value. In some aspects, the SCI transmission at time instance m indicate sidelink resources that are a subset of candidate resources identified at time instance (m−T3), where T3 is a maximum time needed to complete sensing and resource selection procedure. In some aspects, for a given resource selection process within slots of the resource pool, where t(kp), t(kp+1), t(kp+2) are slots selected for potential PSCCH/PSSCH sidelink transmission, the distance in logical slots between t(kp+N−1)-t(kp) <scheduling window size W. In some aspects, N=2 or N=3≤Nmax, kp is the index of selected sidelink resource within a resource pool, and t(kp) is the logical index of sidelink resource in the resource pool. In some aspects, a sensing window start is controlled by configurable parameter T0. In some aspects, the value of T0 can be selected from the following range W≤T0≤$T_{SPS\_MAX\_PERIOD}$, where $T_{MAX\_SPS\_PERIOD}$ is the maximum value of SPS periods supported by system configuration.

In some aspects, configured value T0 puts a constraint on the maximum SPS period (PSPS) of the semi-persistent process indicated in SCI, i.e. PSPS≤T0. In some aspects, SCI resource reservation signaling in slot 'm' and resource selection window [n+T1, n+T2] has relation defined using one of the following alternatives: Alt. 1 (preferred): n=m−T3−T1, where T3 is defined in slot units; Alt. 2: n=ceil(m Tslot−T3−T1)/Tslot, where Tslot is a slot duration; Alt. 3: n=ceil(m Tslot−T3−Tproc,1)/Tslot, where Tslot is a slot duration; and Alt. 4: n=m−T3−Tproc,1, where T3 and Tproc,1 are defined in slot units.

In some aspects, a set of reserved resources is signaled in SCI at slot 'm'. In some aspects, to create a set of reserved resources, the UE selects M sidelink resources in the resource selection window [n+T1, n+T2] using the following alternative options: Alt. 1. M is determined by UE implementation, M≤$M_{TARGET}$. Alt.2. M=$M_{TARGET}$−$M_{TX}$, where $M_{TARGET}$ is the intended number of transmissions determined for a given TB, and $M_{TX}$ is the number of accomplished transmissions of a given TB including transmission at slot 'm'. In some aspects, the UE indicates reservation of N earliest in time resources out of M selected sidelink resources, where N≤M, where N is determined by UE implementation subject to Nmax configuration constraints.

In some aspects, once initial resource reselection is triggered at time slot n, resource selection procedure comprised at least from the one or multiple steps:

Step-0. Initialize R(n−Δ) as an empty set of resources for potential sidelink transmission;

Step-1. Generate a set of candidate resource CS(n);

In some aspects, the UE forms a set of candidate resources for sidelink transmission—CS(n) based on the processing of sensing window [n−T0, n−Tproc,0) for the corresponding resource selection window [n+T1, n+T2].

Step-2. Select resources R(n) for potential transmission at slots t(n) from CS(n);

In some aspects, the UE selects M resources R(n)={R0(n), . . . , RM−1(n)} from CS(n) for potential sidelink transmission in slots t(n)={t0(n), . . . , tM−1(n)}, ordered in time, where (n+T1)≤t0(n) and t(M−1)(n)≤(n+T2).

Step-3. Re-evaluation of selected candidate resources;

In some aspects, the UE finds A the intersection of CS(n) and R(n−Δ), i.e. $R_\cap$(n)=CS(n)∩R(n−Δ). In some aspects, the UE finds ∪ union $R_\cup$(n) of intersection $R_\cap$(n) and R(n): $R_\cup$(n)=$R_\cap$(n)∪R(n)=(CS(n)∩R(n−Δ))∩R(n).

For the time slot n, UE selects and store M resources for potential transmission from $R_\cap$(n), i.e. R(n)={R0(n), . . . , RM−1(n)} for transmission at slots t(n)={t0(n), . . . , tM−1(n)}. In some aspects, the previously selected resources R(n−Δ) can be released (flashed out).

Step-4;

If (t0(n)=(n+T1)):

The UE transmits SCI at slot (n+T1) and indicates reserved resources R1(n) at slot t1(n) (or R1(n) and R2(n) at slots t1(n) and t2(n) respectively).

If the UE needs to reserve additional sidelink resources, UE advances n by Δ towards slot t1(n)−T3 or to t2(n)−T3 and goes to Step-1.

The next set of reserved resources is selected by UE at time instance R1(n)−T3 or R2(n)−T3.

The UE indicates the reservation of additional sidelink resources during SCI transmission in R1(n) and R2(n) at time slots t1(n) and t2(n).

If (t0(n)>(n+T1)): the UE advances n by Δ, i.e. n=n+Δ and goes to Step-1.

In some aspects, the maximum number of re-evaluation attempts is preconfigured. In some aspects, the maximum number of re-evaluation attempts is pre-configured per each priority value. In some aspects, when resource (re)-selection is triggered at time instance n, the UE determines number M of sidelink resources to be selected out of the set of candidate resources CS(n) of size $M_{CS}$.

In some aspects, the UE prioritizes the selection of at least one earliest in time candidate resource among $M_{CS\text{-}EIT}$ earliest in time resources ($M_{EIT}$<$M_{CS}$), where $M_{EIT}$ is configured per priority. In some aspects, remaining (M−1) resources are randomly selected from CS(n) subject to signaling (scheduling) window—W constraints.

In some aspects, $M_{EIT}$ value is configured per CBR. In some aspects, the scheduling window and the sensing window are configured in such a way that the following relationship between T3, Tproc,0 and Tproc,1 is valid: Set Tproc,0 to 0 (Tproc,0=0); Redefine sensing window [n−T0, n−Tproc,0) to [n−T0, n−1]; T3 and Tproc,1 are measured in slots; and set T3 to Tproc,1 i.e. T3=Tproc,1 and therefore T3 is not standardized.

In some aspects, high priority transmission may pre-empt resources occupied by lower priority transmissions. In some aspects, a pre-emption enablement flag is introduced to enable a pre-emption operation. In some aspects, a pre-emption flag for each combination of pi and pj can be introduced, where pi is the priority indication associated with the resource indicated in SCI by other UEs, and pj is the priority of the transmission in the UE selecting resources similar to the agreed mechanism of RSRP threshold configuration. In some aspects, a pre-emption flag for the difference value between pi and pj can be introduced, where pi is the priority indication associated with the resource indicated in SCI by other UEs, and pj is the priority of the transmission in the UE selecting resources similar to the agreed mechanism of RSRP threshold configuration. In some aspects, a bit indicating support of pre-emption is specified per resource pool. In some aspects, Tx/Rx priority-specific enablement flags are configured per resource pool.

Figure 4:
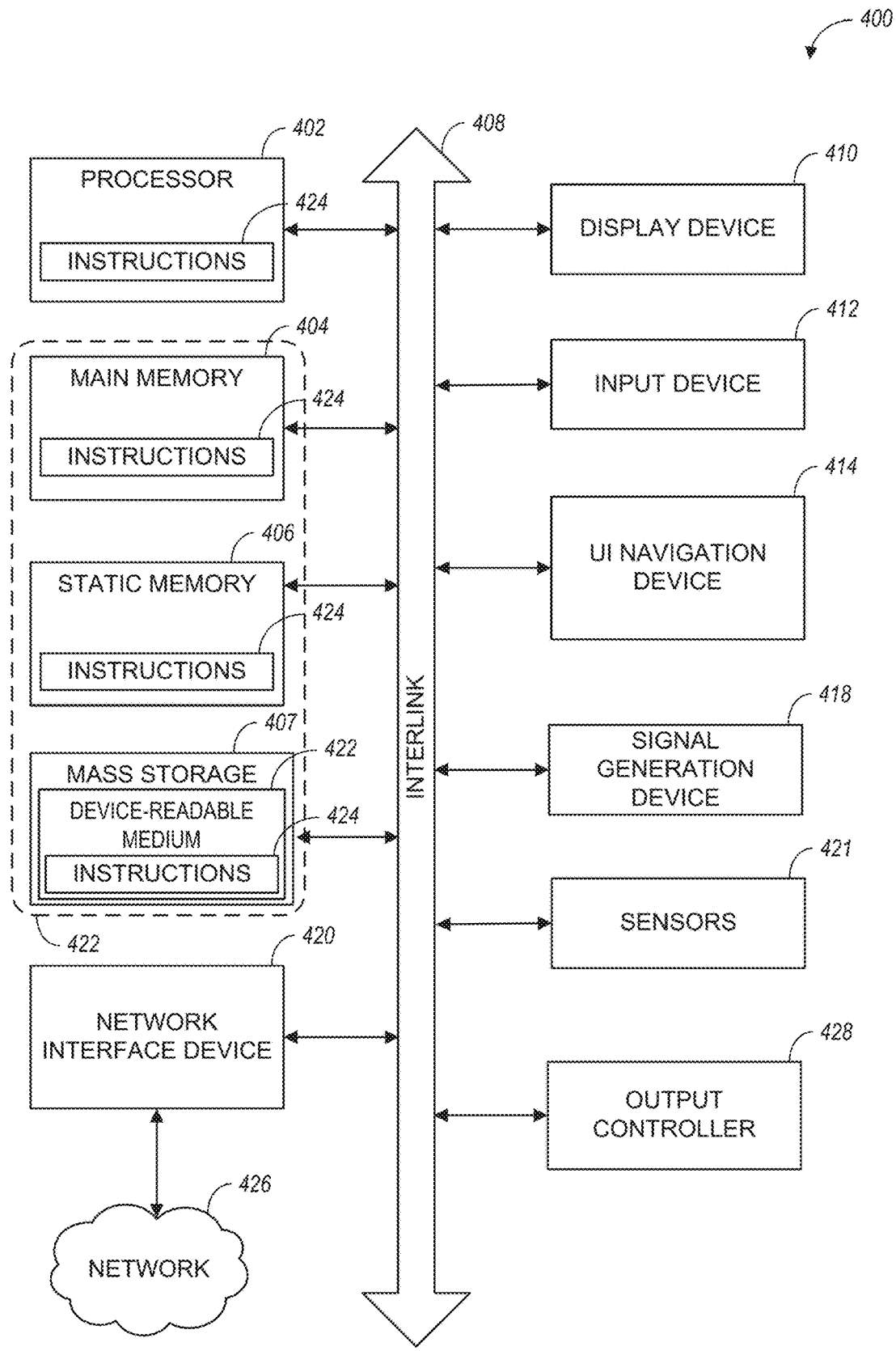
FIG. 4 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 4 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 400 may operate as a standalone device or may be connected (e.g., networked) to other communication devices.

Circuitry (e.g., processing circuitry) is a collection of circuits implemented in tangible entities of the device 400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 400 follow.

In some aspects, the device 400 may operate as a standalone device or may be connected (e.g., networked) to other devices. In a networked deployment, the communication device 400 may operate in the capacity of a server communication device, a client communication device, or both in server-client network environments. In an example, the communication device 400 may act as a peer communication device in a peer-to-peer (P2P) (or other distributed) network environment. The communication device 400 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 400 may include a hardware processor 402 (e.g., a central processing unit (CPU), a graphics processing unit (GPU), a hardware processor core, or any combination thereof), a main memory 404, a static memory 406, and mass storage 407 (e.g., hard drive, tape drive, flash storage, or other block or storage devices), some or all of which may communicate with each other via an interlink (e.g., bus) 408.

The communication device 400 may further include a display device 410, an alphanumeric input device 412 (e.g., a keyboard), and a user interface (UI) navigation device 414 (e.g., a mouse). In an example, the display device 410, input device 412, and UI navigation device 414 may be a touch-screen display. The communication device 400 may additionally include a signal generation device 418 (e.g., a speaker), a network interface device 420, and one or more sensors 421, such as a global positioning system (GPS) sensor, compass, accelerometer, or another sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 407 may include a communication device-readable medium 422, on which is stored one or more sets of data structures or instructions 424 (e.g., software) embodying or utilized by any one or more of the techniques or functions described herein. In some aspects, registers of the processor 402, the main memory 404, the static memory 406, and/or the mass storage 407 may be, or include (completely or at least partially), the device-readable medium 422, on which is stored the one or more sets of data structures or instructions 424, embodying or utilized by any one or more of the techniques or functions described herein. In an example, one or any combination of the hardware processor 402, the main memory 404, the static memory 406, or the mass storage 416 may constitute the device-readable medium 422.

As used herein, the term "device-readable medium" is interchangeable with "computer-readable medium" or "machine-readable medium". While the communication device-readable medium 422 is illustrated as a single medium, the term "communication device-readable medium" may include a single medium or multiple media (e.g., a centralized or distributed database, and/or associated caches and servers) configured to store the one or more instructions 424. The term "communication device-readable medium" is inclusive of the terms "machine-readable medium" or "computer-readable medium", and may include any medium that is capable of storing, encoding, or carrying instructions (e.g., instructions 424) for execution by the communication device 400 and that cause the communication device 400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 424 may further be transmitted or received over a communications network 426 using a transmission medium via the network interface device 420 utilizing any one of a number of transfer protocols. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input-multiple-output (SIMO), MIMO, or multiple-input-single-output (MISO) techniques. In some examples, the network interface device 420 may wirelessly communicate using Multiple User MIMO techniques.

The term "transmission medium" shall be taken to include any intangible medium that is capable of storing, encoding, or carrying instructions for execution by the communication device 400, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE), the apparatus comprising:
   processing circuitry, wherein to configure the UE for Fifth Generation New Radio (5G-NR) sidelink communications, the processing circuitry is to:
   determine a sidelink control information (SCI) format, the SCI format received via a physical sidelink control channel (PSCCH), and the SCI format including priority information for a scheduled physical sidelink shared channel (PSSCH) transmission;
   determine first configuration information and second configuration information using configuration signaling, the first configuration information identifying a sensing window, and the second configuration information identifying a resource selection window, wherein a boundary of the resource selection window is based on the priority information;
   determine during the sensing window, a set of candidate single-slot resources from a resource pool;
   select during the resource selection window, a resource from the set of candidate single-slot resources;
   encode control information for a sidelink transmission;
   cause the sidelink transmission via the PSCCH, the sidelink transmission using the resource;
   encode a resource reservation for a PSCCH transmission in a second SCI format, the resource reservation indicating N resources from a set of resources selected by higher layers with N smallest slot indices; and
   cause the PSCCH transmission of the second SCI format; and
   memory coupled to the processing circuitry.

2. The apparatus of claim 1, wherein the boundary of the resource selection window corresponds to a number of pre-defined slots based on a sub-carrier spacing (SCS).

3. The apparatus of claim 2, wherein the number of pre-defined slots is determined as $5*2^\mu$, where $\mu=0, 1, 2,$ and 3 refers to SCS of 15, 30, 60, and 120 kHz respectively.

4. The apparatus of claim 1, wherein the processing circuitry is further to:
   select a time instance n as a resource selection trigger; and
   perform resource sensing during the sensing window to obtain the set of candidate resources, the sensing window precedes the time instance n.

5. The apparatus of claim 4, wherein the resource selection window starts after the time instance n and ends at a time instance (n+T2), and wherein T2 is a timing value selected based on the priority information.

6. The apparatus of claim 5, wherein the processing circuitry is to:

select a timing value T2min based on a remaining packet delay budget (PDB) for performing resource sensing during the sensing window and resource selection during the resource selection window; and
select the timing value T2 to be greater than or equal to the timing value T2min.

7. The apparatus of claim 1, further comprising:
transceiver circuitry coupled to the processing circuitry; and
one or more antennas coupled to the transceiver circuitry.

8. A non-transitory computer-readable storage medium that stores instructions for execution by one or more processors of a base station, the instructions to configure the base station for Fifth Generation New Radio (5G-NR) sidelink communications, and to cause the base station to perform operations comprising:
transmitting configuration signaling to a first user equipment (UE) in a sidelink communication with a second UE, the configuration signaling including first configuration information and second configuration information, the first configuration information identifying a sensing window, and the second configuration information identifying a resource selection window, wherein a boundary of the resource selection window is based on priority associated with the sidelink communication,
wherein the boundary of the resource selection window corresponds to a number of pre-defined slots based on a sub-carrier spacing (SCS), and
wherein the number of pre-defined slots is determined as $5*2^\mu$, where $\mu=0, 1, 2,$ and 3 refers to SCS of 15, 30, 60, and 120 kHz respectively.

9. A non-transitory computer-readable storage medium that stores instructions for execution by one or more processors of a user equipment (UE), the instructions to configure the UE for Fifth Generation New Radio (5G-NR) sidelink communications, and to cause the UE to perform operations comprising:
determining a sidelink control information (SCI) format, the SCI format received via a physical sidelink control channel (PSCCH), and the SCI format including priority information for a scheduled physical sidelink shared channel (PSSCH) transmission;
determining first configuration information and second configuration information using configuration signaling, the first configuration information identifying a sensing window, and the second configuration information identifying a resource selection window, wherein a boundary of the resource selection window is based on the priority information;
determining during the sensing window, a set of candidate single-slot resources from a resource pool;
selecting during the resource selection window, a resource from the set of candidate single-slot resources;
causing a sidelink transmission of control information via the PSCCH, the sidelink transmission using the resource;
encoding a resource reservation for a PSCCH transmission in a second SCI format, the resource reservation indicating N resources from a set of resources selected by higher layers with N smallest slot indices; and
causing the PSCCH transmission of the second SCI format.

10. The non-transitory computer-readable storage medium of claim 9, wherein the boundary of the resource selection window corresponds to a number of pre-defined slots based on a sub-carrier spacing (SCS).

11. The non-transitory computer-readable storage medium of claim 10, wherein the number of pre-defined slots is determined as $5*2^\mu$, where $\mu=0, 1, 2,$ and 3 refers to SCS of 15, 30, 60, and 120 kHz respectively.

12. The non-transitory computer-readable storage medium of claim 9, the instructions further comprising:
selecting a time instance n as a resource selection trigger; and
performing resource sensing during the sensing window to obtain the set of candidate resources, the sensing window precedes the time instance n.

13. The non-transitory computer-readable storage medium of claim 12, wherein the resource selection window starts after the time instance n and ends at a time instance (n+T2), and wherein T2 is a timing value selected based on the priority information.

14. The non-transitory computer-readable storage medium of claim 13, the instructions further comprising:
selecting a timing value T2min based on a remaining packet delay budget (PDB) for performing resource sensing during the sensing window and resource selection during the resource selection window; and
selecting the timing value T2 to be greater than or equal to the timing value T2min.

* * * * *

UNITED STATES PATENT AND TRADEMARK OFFICE
CERTIFICATE OF CORRECTION

PATENT NO. : 11,924,808 B2  
APPLICATION NO. : 17/084192  
DATED : March 5, 2024  
INVENTOR(S) : Chervyakov et al.

Page 1 of 1

It is certified that error appears in the above-identified patent and that said Letters Patent is hereby corrected as shown below:

On the Title Page

Item (73), in "Assignee", in Column 1, Line 1, delete "Coporation," insert --Corporation,-- therefor Signed and Sealed this  
Twenty-second Day of July, 2025

Coke Morgan Stewart  
*Acting Director of the United States Patent and Trademark Office*